Patented Sept. 30, 1941

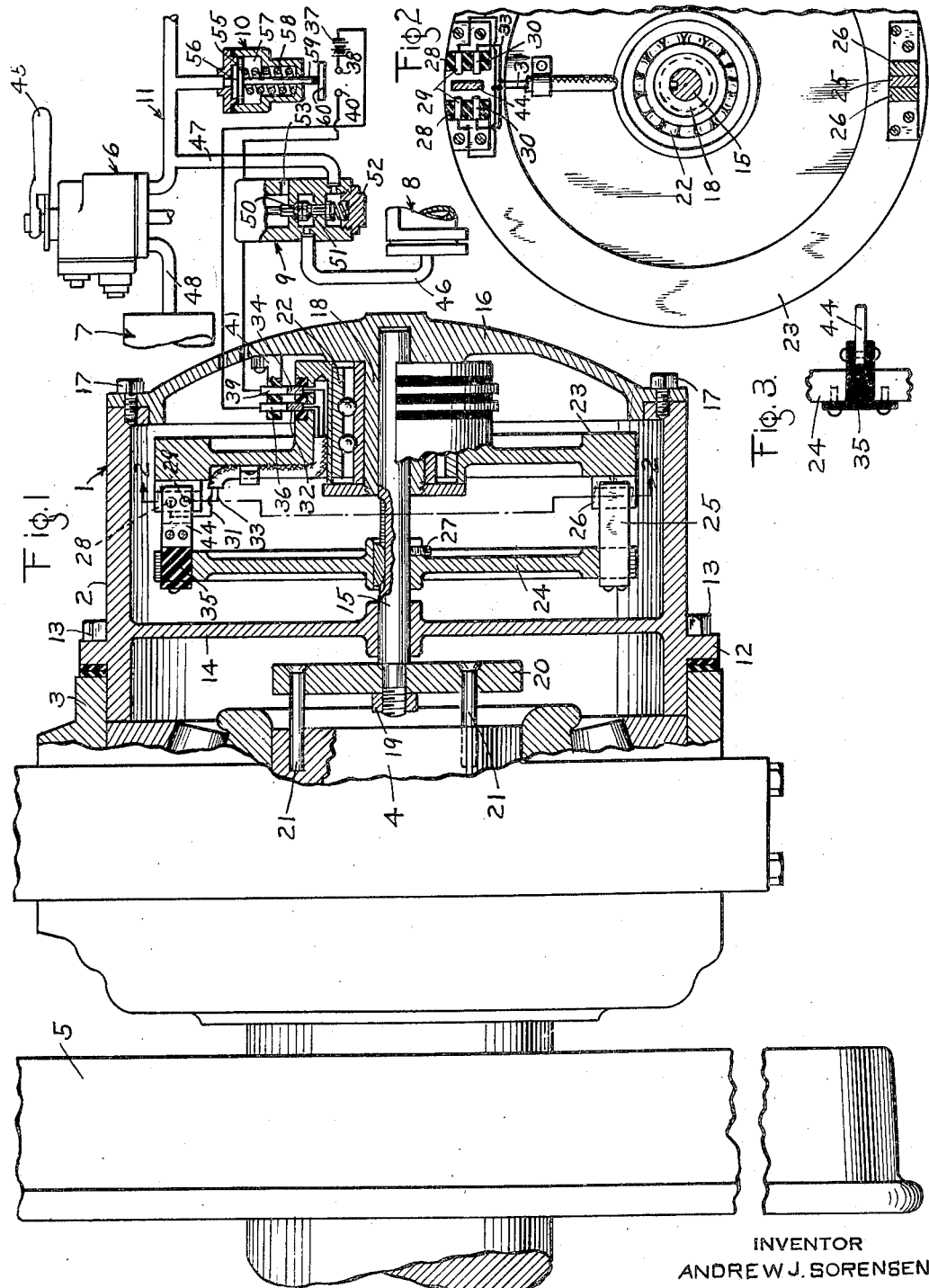

2,257,315

UNITED STATES PATENT OFFICE 2,257,315

INERTIA DEVICE

Andrew J. Sorensen, Edgewood, Pa., assignor to The Westinghouse Air Brake Company, Wilmerding, Pa., a corporation of Pennsylvania Application April 2, 1940, Serial No. 327,386

10 Claims. (Cl. 264—1)

This invention relates to control apparatus for controlling certain operations of a portion or portions of a mechanism according to the rate of change in speed of another operating portion or portions of the mechanism, and has particular relation to a rotary inertia apparatus associated with individual wheels or wheel and axle assemblies of railway vehicles for so controlling the brakes associated with such wheels or wheel and axle assemblies as to prevent sliding thereof.

When a braking force retarding rotation of a vehicle wheel is sufficient to exceed the limit of adhesion or rolling friction between the wheel and road surface or rail on which the wheel rolls, the wheel decelerates at a rapid rate to a non-rotative or locked state while the vehicle continues to travel in its direction of motion. The dragging of a vehicle or car wheel along a road surface or rail in a locked state is referred herein as "sliding" or a "sliding condition" of the wheel.

If the braking force retarding the retardation of the vehicle or car wheel is rapidly reduced at the instant that a wheel begins to rotate at a speed less than a speed corresponding to vehicle or rail speed, the wheel will cease deceleration and accelerate back to a speed corresponding to vehicle or rail speed before actually attaining the locked state. The rotation of a vehicle wheel at a speed less than a speed corresponding to vehicle or rail speed at the same instant is referred herein as "slipping" or a "slipping condition" of the wheel as distinguished from a sliding condition.

Various types of rotary inertia devices associated with individual wheels or wheel and axle assemblies have been proposed for instantly and rapidly releasing the brakes on a car wheel at the instant that it begins to slip, and thus guarding against sliding of the wheels, which sliding is objectionable because of the development of flat spots on the wheels and the necessity for repair or replacement of the wheels. In a pending application of Clyde C. Farmer, Serial No. 219,616, filed July 16, 1938, now Patent No. 2,198,033, assigned to the assignee of this application, a rotary inertia device of this character is disclosed and claimed.

In this type of rotary inertia device the rotatable inertia element is journaled on the rotatable member or shaft which is driven by the axle and which drives the inertia element, there being a resilient driving connection from the rotatable member to the inertia element which, with the brakes released, normally insures the rotation of the inertia element in unison with the rotatable member. When an application of the brakes has been initiated and the resulting rate of deceleration of the axle and thereby the rotatable member is such that the static friction of the inertia element and force of the resilient driving means between the rotatable member and inertia element are overcome, the inertia element will overrun the rotatable member and, through suitable apparatus, will effect a reduction in the braking force retarding the rotation of the member.

When the braking force retarding the rotation of the wheel and axle assembly and thereby the rotatable member is thus reduced at the instant that the member begins to rotate at a speed less than a speed corresponding to member speed, the wheel and axle assembly and rotatable member will cease deceleration and accelerate back toward a speed corresponding to vehicle or rail speed before actually attaining the locked state. As these parts accelerate back toward a speed corresponding to rail speed, the rotatable member will overrun the rotatable inertia element and effect the operation of suitable means to continue the reduction in braking force. Now when the rotative speed of the inertia element is again substantially equal to that of the rotatable member, the resilient driving means will act to move the inertia element to a central or neutral position in which the braking force on the rotatable member may be again increased, the amount of the relative movement between the rotatable member and the rotatable inertia element being slight, i. e., considerably less than a quarter of a revolution.

Due to the motion of a vehicle in actual train service, the inertia device and especially the rotatable inertia element thereof is subject to violent vibrations which in time may cause fretting or excessive wear of the bearing surface of the element. Since the inertia element may move only a very short distance relative to the rotatable member on which it is mounted, there will be but a slight rubbing action between the bearing surfaces of the member and element and as a consequence excessive fretting or excessive wear of one or both of the bearing surfaces is liable to occur.

Since the inertia element can only move a slight distance relative to the rotatable member on which it is journaled, any dirt or hard particles which may lodge between the bearing surfaces will, due to the limited relative movement between the element and member, cause uneven wear of the bearing surfaces, and due to the vibratory action above referred to will cause excessive fretting of the bearing surface over a very limited area.

This damage to the bearing surfaces may increase the frictional resistance of the element to movement relative to the rotatable member and cause the element to operate erratically. If the damage is great enough it may even cause the inertia element to bind on the rotatable element and prevent the necessary relative movement between these parts, thereby rendering the inertia device as a whole inoperative to control the brakes.

It will be apparent from the foregoing description that the force of the deceleration or acceleration of the rotatable member which it is desired to utilize must not only be great enough to overcome the opposing force of the resilient driving means for the inertia element but must also overcome the static friction between the rotatable member and the inertia element, and since the degree of such friction is subject to variations due to temperature, kind of material, state of lubrication, etc., it may contribute materially to the erratic operations of the inertia element.

An object of the invention is to provide a rotary inertia device of the type above indicated which is so constructed as to eliminate the above mentioned objectionable characteristics.

This object is attained by rotatably mounting the inertia element on a member which is fixed relative to the rotatable member, so that the element is free to completely rotate about the member on a suitable friction, ball or roller bearing, thus eliminating static friction between the element and member, since the inertia element rotates completely about the member, the bearing surfaces between the element and member are not so liable to become fretted or worn to the extent that they would seriously interfere with the proper operation of the element.

Other objects and advantages of the invention will appear on the following and more detailed description.

In the drawing Fig. 1 is a view, mainly in vertical section, of one embodiment of my invention, together with a diagrammatic representation of a simple brake control equipment with which it may be associated; Fig. 2 is a fragmentary sectional view taken on the line 2—2 of Fig. 1, a thrust bearing plate being omitted to more clearly illustrate a roller bearing of the apparatus; and Fig. 3 is a fragmentary detail plan view of a portion of the mechanism embodied in the invention.

Referring now in detail to the drawing, the reference character 1 indicates a rotary inertia device having a tubular casing 2 which is adapted to replace the usual cover plate at the outer end of the journal housing 3 for a wheel and axle assembly, which assembly may comprise an axle 4 and a pair of wheels 5, only one of which wheels is shown. The rotary inertia device may be employed in any type of brake equipment and, for purposes of illustration, it is shown as being employed in a very simple fluid pressure brake equipment.

The fluid pressure brake equipment shown may comprise a manually operable self-lapping brake valve device 6, a source of fluid under pressure, such as the main reservoir 7, located on the control car or locomotive of the train, a brake cylinder 8, one or more of which may be provided for each individual wheel and axle assembly or plurality of assemblies, a release and reapplication magnet valve device 9, a pressure operated switch device 10, and a straight air pipe 11.

The tubular casing of the inertia device has an annular securing flange 12 which may be rigidly secured to the outer end of the journal box housing 3 by means of bolts 13 or other suitable securing means.

Within the tubular casing 3, and preferably formed integral therewith, is a wall 14 having a central opening in which the inner end portion of a rotatable shaft 15 is journaled. This shaft is axially aligned with the axle 4 of the wheel and axle assembly and has its outer end journaled in a cover plate 16 which is rigidly but removably secured to the tubular casing section by means of bolts 17.

In the present embodiment of the invention the cover plate 16 is provided with an inwardly extending rigid support member 18 which is axially aligned with the axle 4 and shaft 15 and which is preferably integral with the cover plate. This member is provided with a central bore within which the outer end portion of the shaft 15 is journaled.

Rigidly secured to the shaft 15 by means of a nut 19 which has screw-threaded connection with the inner end of the shaft, is a disk 20 having spaced driving pins or projections 21 which, as shown in the present embodiment of the invention, may fit in corresponding openings provided in the end face of the axle 4. This disk and projection constitutes a driving connection through which the axle 4 transmits rotary motion to the shaft 15.

Rotatably mounted on a roller bearing 22 carried by the support member 18 is an inertia element which, as shown in the present embodiment of the invention, may be made in the form of a fly wheel 23 and which may be arranged to be driven by the shaft 15 through the medium of a resilient means comprising a member 24 preferably of annular form which is located between the fly wheel 23 and the wall 14 of the casing and which is keyed to the shaft 15 for rotation therewith, a driving spring 25 having one end secured to the annular member, and spaced driving lugs 26 which are rigidly carried by the rim portion of the fly wheel 23 and between which the driving spring fits and operatively engages the lugs. The annular member 24 is adjustable in the direction of the length of the shaft 15 but is normally secured to the shaft in its proper position by a set screw 27.

Secured to the side of the rim of the fly wheel 23 are two spaced insulating blocks 28 in each of which there are suitably mounted spaced contact points 29 and 30, the contact 29 being connected through the medium of a wire 31 to an annular collector ring 32 mounted on a suitable block of insulating material carried by the hub of the fly wheel, and the contact 30 being connected through the medium of a wire 33 to a collector ring 34 also mounted in the block of insulating material.

Secured to the member 24 is a block of insulating material 35 to which is secured a circuit closing element 44 which extends between the pairs of contacts carried by the fly wheel 23 and which, as will hereinafter be more fully described, is adapted to engage either pair of contacts to close an electric circuit for effecting control of the brake equipment shown.

The collector ring 32 carried by the hub of the fly wheel 23 is slidably engaged by brush 36 which is connected to one terminal of a source of electric current such as the battery 37, the other terminal of the battery being connected to a contact point 38 of the switch device 10. The collector 34 is slidably engaged by a brush 39 which is connected to one end of the winding of the magnet valve device 9, the other end of the magnet winding being connected to a switch point 40 of the switch device 10. The collector brushes 32 and 40 are carried by a bracket 41 secured to the cover plate 16.

The self-lapping brake valve device 6 may be of the type described in detail and claimed in Patent No. 2,042,112 of Ewing K. Lynn and Rankin J. Bush, and since the details of this type of brake valve device are so well known, only a brief functional description thereof is deemed necessary here to clearly understand its action in controlling the brake. The device has an operating handle 45 which is shiftable in a horizontal plane from a normal release position into an application zone.

With the operating handle 45 in its normal release position, the brake cylinder 8 is vented to the atmosphere at the brake valve device through a brake cylinder pipe 46, magnet valve device 9, a pipe 47, and straight air pipe 11. When the operating handle 45 is shifted into the application zone, fluid under pressure is supplied from the main reservoir 7 through a supply pipe 48 to the straight air pipe 11 and through pipe 47, magnet valve device 9 and pipe 46 to the brake cylinder 8 to establish a pressure therein substantially proportional to the degree of displacement of the operating handle out of its release position.

If the pressure in the straight air pipe 11 reduces or tends to reduce due to leakage of fluid from the brake cylinder 8, the brake valve device 6 operates automatically to supply fluid under pressure to the straight air pipe to maintain or reestablish a pressure corresponding to the position of the brake valve handle 45 in the application zone.

The magnet valve device 9 comprises a vent or release valve 50 and a supply cut-off valve 51, and further comprises a spring 52 which normally maintains the vent valve 50 closed and the supply valve open. When however the winding of the device is energized, the vent valve 50 will be unseated and the supply valve 51 seated. With the valve 50 unseated fluid under pressure will be released from the brake cylinder 8 to the atmosphere by way of pipe 46, unseated valve 50 and a port 53 leading to the atmosphere. When the winding is again deenergized the spring 52 acts to move the valve 50 to its seated position and the valve 51 to its unseated position. With the valve 51 unseated, fluid under pressure again flows from pipe 47 past the unseated valve 51 to the pipe 46 and thereby to the brake cylinder 8.

The pressure operated switch device 10 comprises a casing in which there is operatively mounted a piston 55 having at one side a chamber 56 which is constantly connected to the straight air pipe 11 and having at the other side a chamber 57 containing a spring 58 which normally maintains the piston in its innermost position as shown in Fig. 1 of the drawing. The piston 55 is provided with a stem 59 which extends through a central bore in the casing and which at its outer end is provided with a connector 60 for connecting the contact points 38 and 40.

When the brake valve device 6 is initially operated to supply fluid under pressure to the straight air pipe 11 fluid under pressure flows from the pipe 11 to the piston chamber 56 of the switch device 10 causing the piston to move outwardly against the opposite pressure of the spring 58 and move the connection 60 into the engagement of the contact points 38 and 40.

With the brakes released as shown, the contact member 44 which is carried by the annular member 24 is out of contact with both sets of contacts 28 and 30 so that the winding of the magnet valve device will be maintained deenergized.

*Operation of the equipment*

Assuming the main reservoir 7 to be charged with fluid under pressure to the normal pressure carried therein, the brakes released and the train or car equipped with the invention traveling along the road under power or coasting, and the operator desires to effect an application of the brakes, the brake valve handle 45 is shifted from release position into the application zone, after first cutting off the propulsion of the car if the power is on, the degree of movement of the handle in the application zone being according to the desired degree of application. In response to such movement, fluid under pressure is supplied to the brake cylinder to effect application of the brakes associated with the wheel and axle assembly.

If the degree of application of the brake is such as not to cause slipping of the vehicle wheels 5 and axle 14, the contact 44 carried by the annular member 24 will remain out of contact with the contact points 28 and 30 carried by the fly wheel 23 as shown in Fig. 2 of the drawing, the drive spring 25 having sufficient rigidity to drive the fly wheel 23 and prevent relative movement between the member 24 and the fly wheel.

If, however, the wheel and axle assembly should slip due to the application of the brakes, the fly wheel 23 tends to continue at its original speed while the axle decelerates rapidly, and as a result the fly wheel 23 is shifted to a leading position rotarily with respect to the axle, thus moving the contact 44 into engagement with one set of contacts 28 and 30 carried by the fly wheel.

The pressure switch device 10 having already been operated to circuit closing position by the pressure of fluid supplied from the straight air pipe to the piston chamber 56, the engagement of the contact member 44 with the contact points 28 and 30 completes the circuit for energizing the winding of the magnet valve device 9 which, under such energization operates to seat the supply valve 51 and thereby cut off the communication from the supply pipe 47 to the brake cylinder pipe 46, and unseats the exhaust valve 50 so as to vent fluid under pressure from the pipe 46 and thereby from the brake cylinder 8 to the atmosphere by way of the atmospheric passage 53.

Due to the rapid venting of fluid under pressure from the brake cylinder 8 substantially instantaneously with the initiation of slipping of the vehicle wheels 5 and axle 4 and the consequent reduction in the degree of application of the brakes associated with the wheels, the wheels cease deceleration at the excessive rate incidental to slipping and begin to accelerate rapidly back toward speed corresponding to car or rail speed. In view of the fact that the weight of the car wheel or the wheel and axle assembly is relatively small compared to the weight of the car, the rate of acceleration of the wheels and axle back toward a speed corresponding to vehicle or rail speed is exceedingly rapid, being at least as great as the rate of deceleration in slipping.

Accordingly, it will be seen that as a result of the reduction in the rate of deceleration and the subsequent acceleration of the wheels and axle the member 24 overtakes and tends to overrun the fly wheel 23. The fly wheel accordingly is no longer in a leading position with respect to the member 24 but is in a lagging position with respect to the member, in which position the contact member 44 will engage the other set of contact points 28 and 30 and maintain the circuit through the winding of the magnet valve device 9 completed. It should be here mentioned that the movement of the switch contact to this latter position by the overrunning action of the member 24 will be effected so rapidly that the magnet valve device will not operate to permit the spring 52 to unseat the supply valve 51 and seat the exhaust valve 50.

Now as the axle 4 and wheels 5 approach a rotative speed corresponding to car or rail speed, the rate of acceleration of the member 24 decreases below that sufficient to maintain the fly wheel 23 in lagging position with respect to the member 24 and consequently the spring drive member 25 will act to return the fly wheel to its normal position with respect to the member 24, with the result that the contact member 44 will be returned to its normal disengaged position and the electromagnet winding of the magnet valve device 10 will be deenergized, so that upon the spring 52 will act to seat the exhaust valve 50 and unseat the supply valve 51. With the supply valve unseated fluid under pressure will again be supplied to the brake cylinder 8 to the pressure called for by the position of the brake valve handle.

In bringing the vehicle or train to a stop it is customary for the operator to reduce the degree of application of the brakes as the speed of the train decreases. Accordingly the operator does not maintain the brake valve handle 45 in its original position but returns it toward release position as the speed of the train reduces. Consequently the pressure ultimately restored in the straight air pipe 11 and brake cylinder 8 will not be as great as that which produced or caused the slipping of the wheel and axle assembly in the first place, so that recurrence of the wheel slipping is unlikely.

However in the event that the degree of application of the brakes resulting from the restored pressure in the brake cylinder 8 is sufficient to again cause slipping of the wheels the previous operation is repeated so that in no case are the car wheels permitted to attain a locked state.

When the car or train has been brought to a stop the operator may shift the handle 45 of the brake valve device 6 a maximum degree into the application zone to obtain a maximum degree of application of the brakes sufficient to hold the car or train on any grade condition encountered in service. Should there be leakage from the straight air pipe 11 and brake cylinder 8 the self-lapping brake valve device 6 will operate automatically in the usual well known manner to supply fluid under pressure to the straight air pipe and brake cylinder to compensate for such leakage.

When the operator desires to release the brakes preparatory to again starting the train, he moves the brake valve handle 45 to its release position, causing fluid under pressure to be released from the brake cylinder 8 through the straight air pipe 11 to atmosphere thereby completely releasing the brakes.

The pressure switch device 10 is returned to circuit opening position as the result of the reduction of the pressure in the straight air pipe 11 to some low degree in starting the car or train. If the inertia device is associated with a motor driven wheel and axle assembly and is subjected to excessive propulsion torque causing the assembly to accelerate suddenly, the shaft 15 and member 24 rotatable with the axle will overrun the fly wheel 23 until such time as the fly wheel is brought up to substantially member speed. When the member thus overruns the fly wheel the contact member 44 engages one set of contacts 28 and 30 but this will have no effect on the magnet valve device 9 since the circuit to the winding thereof is maintained open by the pressure switch device 10. From this it will be apparent that no objectionable operation of the brake equipment will result from the application of excessive propulsion torque applied to the wheel and axle assembly.

From the foregoing description it will be apparent that with the fly wheel journaled independently of the shaft 15 upon a fixed support, the frictional resistance of opposing operation of the fly wheel relative to the shaft 15 will be considerably less than the static friction which must be overcome in the devices of the type where the fly wheel is journaled directly upon the shaft. As a result of this the fly wheel will be more sensitive to any change in the rate of speed in the wheel and axle assembly and will therefore contribute materially to the more accurate control of the brakes.

It will also be apparent that since the fly wheel makes complete revolutions around its parts, the contacting bearing surfaces between the fly wheel 23 and the support 18 will wear evenly, and thereby substantially eliminate the excessive fretting of the bearing surfaces, all of which contributes to the accurate operation of the fly wheel relative to the shaft 15. Another very desirable feature in having the fly wheel rotate completely on its bearing is that such action will tend to roll dirt or other foreign matter from between the bearing surfaces and thus eliminate the possibility of excessive wear and will of course eliminate the localized excessive wear and fretting.

It will here be understood that although the inertia apparatus has been described in connection with a fluid pressure brake mechanism it may be employed for controlling other mechanisms often associated with air brakes applied to railway vehicles.

Having now described my invention, what I claim as new and desire to secure by Letters Patent, is:

1. An inertia device of the type for registering the rotative condition of a rotatable member, said device comprising a non-rotative support, a rotary inertia registering element carried solely by said support, said element being rotatable on said support by said rotatable member and shiftable rotatably relative to the rotatable member in response to a change in speed of the rotatable member.

2. In an inertia device of the type for registering the rotative condition of a rotatable member, said device comprising a non-rotative support, a rotary inertia element carried by said support independently of said rotatable member, said element being rotatable on said support by said rotatable member and shiftable relative to the rotatable member for registering the rotative condition of the rotatable member, said rotary inertia element being rotatively shiftable relative to the rotatable member in response to a change in the rotative speed of the rotatable member.

3. An inertia device of the type for registering the rotative condition of a rotatable member, said device comprising a rotary control element rotatably mounted independently of said rotatable member and means associated with said rotatable member for transmitting rotary motion from said member to said element, said control element being movable rotatively relative to said member, in response to a change in the speed of rotation of the rotatable member, for registering such rotative condition of the rotatable member.

4. An inertia device of the type for registering the rotative condition of a rotatable member, said device comprising a rotary control element rotatably mounted independently of said rotatable member, and yieldable means associated with said rotatable member and arranged for transmitting rotary motion from said member to said element, said control element being rotatably movable relative to said member against the opposing force of said yieldable means in response to a change in the speed of the rotation of the rotatable member for registering such rotative condition of the rotatable member.

5. In an inertia device of the type for registering the rotative condition of a rotatable member, said device comprising a single non-rotatable support, a rotary control element carried solely by said support and being rotatably mounted on said support and yieldable means associated with said rotatable member for transmitting rotary motion from said member to the element, said control element being rotatively movable against the opposing force of said yieldable means relative to said member in response to a change in the speed of rotation of the rotatable member for registering such rotative condition of the rotatable member.

6. A rotary inertia device of the type adapted to register the rotative condition of a vehicle wheel and axle assembly, said device comprising a casing, a cover removably associated with said casing and having a non-rotatable support extending into the casing, a rotary element journaled on said support for complete rotation relative thereto, means for holding said element against separation from said support, means for transmitting rotary motion from said wheel and axle assembly to said rotary element, said rotary element being rotatable relative to said wheel and axle assembly in response to a predetermined rate of deceleration in the speed of the wheel and axle assembly for registering the rotative condition of the wheel and axle assembly, the rotary motion transmitting means having an endwise slip connection with said rotary element to facilitate the removal and replacement of said cover and element as a unit with relation to the rotary motion transmitting means and casing.

7. In an inertia device of the type for registering the rotative condition of a rotatable member, said device comprising a non-rotative casing having a body section and a cover section, a rotatable element journaled in said body section and cover section and having a driving connection with said rotatable member, an inertia element rotatively mounted on one of said sections independently of said rotatable element, and means for transmitting rotary motion from said rotatable element to said inertia element, said rotatable element and inertia element being rotatively movable, one relative to the other, upon a predetermined rate of change of the speed of the rotatable member for registering the rotative condition of the rotatable member.

8. In an inertia device of the type for registering the rotative condition of a rotatable member, said device comprising a non-rotative casing having a body section and a cover section, a rotatable element journaled in said body section and cover section and having a driving connection with said rotatable member, an inertia element rotatably mounted on one of said sections independently of said rotatable element and having a driving connection with said rotatable element adapted to yield to the force of the inertia element upon a predetermined rate of change in the speed of the rotatable member and the rotatable element to permit the inertia element to move rotatively relative to the rotatable element for registering the rotative condition of the rotatable element and thereby the rotatable member.

9. In an inertia device of the type for registering the rotative condition of a rotatable member, said device comprising a non-rotative casing having a body section and a cover section removably secured to the body section, a rotatable element journaled in said body section and cover section and having a driving connection with said rotatable member, and an inertia element rotatably mounted on said cover section and removably secured thereto in a unitary structure, and means for transmitting rotary motion from said rotatable element to said inertia element, said rotatable element and inertia element being rotatably movable, one relative to the other, upon a predetermined rate of change of the speed of the rotatable member for registering the rotative condition of the rotatable member, and said inertia element having a slip connection with the rotary motion transmitting means for facilitating removal and replacement of the inertia element and cover section as a unit with relation to the rotary motion transmitting means.

10. In an inertia device of the type for registering the rotative condition of a rotatable member, said device comprising a non-rotative casing having a body section and a cover section removably secured to said body section, a rotatable element journaled in said body section and cover section and having a driving connection with said rotatable member, an inertia element rotatively mounted on said cover section and independently of said rotatable element, and yieldable means for transmitting rotary motion from said rotatable element to said inertia element, said inertia element being rotatively movable relative to said rotatable element upon a predetermined rate of change in the speed of said rotatable member for registering the rotative condition of the rotatable member, and said inertia element having a slip connection with the rotary motion transmitting means and the rotatable element for facilitating the endwise removal or replacement of said cover section and inertia element as a unit with relation to the rotatable element.

ANDREW J. SORENSEN.

CERTIFICATE OF CORRECTION.

Patent No. 2,257,315. September 30, 1941.

ANDREW J. SORENSEN.

It is hereby certified that error appears in the printed specification of the above numbered patent requiring correction as follows: Page 4, second column, line 63, claim 1, before "non-rotative" insert --single--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.